United States Patent [19]

Michalski

[11] 4,001,538
[45] Jan. 4, 1977

[54] METHOD AND APPARATUS FOR PRODUCING SMOOTH SURFACES

[75] Inventor: Arnold Michalski, Piedmont, S.C.

[73] Assignee: Phillips Fibers Corporation, Greenville, S.C.

[22] Filed: Apr. 17, 1975

[21] Appl. No.: 569,331

[52] U.S. Cl. .......................... 219/69 M; 219/69 E
[51] Int. Cl.² ........................................ B23P 1/08
[58] Field of Search ............ 219/69 E, 69 W, 69 R, 219/69 V, 69 G, 69 M

[56] References Cited
UNITED STATES PATENTS

| | | | |
|---|---|---|---|
| 2,079,310 | 5/1937 | Bennett | 219/69 V |
| 2,300,855 | 11/1942 | Allen et al. | 219/69 E |
| 2,385,665 | 9/1945 | Warwick | 219/69 V |
| 2,436,251 | 2/1918 | Dobie et al. | 219/69 V |
| 3,309,303 | 3/1967 | Bender et al. | 219/69 E |
| 3,830,996 | 8/1974 | Ullmann | 219/69 W |
| 3,857,012 | 12/1974 | Stegelman et al. | 219/69 M |

*Primary Examiner*—Bruce A. Reynolds

[57] ABSTRACT

Method and apparatus for producing a continuously smooth surface on a workpiece having an irregular surface comprising a nonsmooth area bordered by a smooth area. Said workpiece is subjected to electrical discharge machining with a rotating electrode, while maintaining an acute angle between the axis of said electrode and the face of said workpiece.

24 Claims, 6 Drawing Figures

METHOD AND APPARATUS FOR PRODUCING SMOOTH SURFACES

This invention relates to producing a continuously smooth surface on a workpiece having a nonsmooth area bordered by a smooth area. In at least one aspect the present invention is an improvement over the invention disclosed and claimed in U.S. Pat. No. 3,857,012, issued Dec. 24, 1974 in the names of A. F. Stegelman and Arnold Michalski. The invention is particularly applicable to, but is not limited to, the repair of spinnerettes. Thus, for convenience only, and not by way of limitation, the invention will be described with particular reference to the repair of spinerettes.

The capillaries in spinnerettes employed for melt spinning of synthetic fibers are required to have an essentially uniform length, an essentially uniform shape, e.g., circular or other shape, and are also required to have a clean damage-free face where the extruded fibers leave the surface of the spinnerette. During use, spinnerettes frequently become damaged as by scratching during handling, by accidental blows during installation, or by scratches imparted by the brass "wipesticks" which are customarily used to periodically wipe the face of the spinnerette during spinning operations so as to remove degraded polymer therefrom.

The damage or damaged areas on the face of the spinnerette can comprise indentations or other irregularities ranging from minor barely visible scratches up to about 0.003 inch deep, to indentations, grooves, etc. having a depth in the order 0.0015 to 0.002 inch, or greater, and a corresponding width. Said damage is particularly serious when it crosses or touches, or is located within about one capillary diameter, of a capillary exit. In such instances the spinnerette must be repaired or replaced as soon as possible. When the capillary exit is damaged or deformed, the shape and quality of the fiber filaments are directly and adversely affected. Damaged capillary exits can also lead to so-called "doglegging" (improper extrusion) of the extruded filaments which is highly undesirable. Indentations such as scratches, grooves, and other irregularities in the face of the spinnerette present damaged areas where polymer can collect and become degraded because it cannot be wiped from the face of the spinnerette. While damaged areas crossing or touching a capillary exit must be promptly repaired, it is also desirable to repair damaged areas located on the face of the spinnerette between capillary exits. Unless otherwise specified, the term "indentation" is employed generically herein to include scrathes, grooves, and other marks or irregularities which destroy the smooth surface of the spinnerette face or deform the capillary exit.

Such damaged areas cannot be efficiently repaired by refinishing the face of the spinnerette by means of a lapping tool. This is because the exit face of the spinnerette becomes slightly convex during use and mechanical lapping shortens the length of the capillaries in the center of the spinnerette. In some instances the damaged area can be spot polished with abrasive stones, etc. However, this method is very slow, requiring on the order of one hour's time per capillary, and requiring considerable operator skill.

The present invention provides an improved solution for the above described problems. It has now been discovered that electrical discharge machining, referred to hereinafter for convenience by the designation EDM, carried out with a rotating electrode which is tilted or inclined at a defined angle can be employed to repair or refinish spinnerettes or other workpieces having damaged areas on the face thereof. The methods and apparatus of the present invention provide increased efficiency over the methods and apparatus of the prior art.

Thus, according to the invention, there is provided a method for producing a continuously smooth surface on a metal workpiece having an irregular surface comprising a nonsmooth area bordered by a smooth area, which method comprises electrically removing metal from said nonsmooth area and said bordering smooth area by subjecting said areas to electrical discharge machining with an electrode which is rotating about its axis and which is inclined at an acute angle, measured between said electrode axis and said workpiece, within the range of from 85° to 89.4°, and thereby blending said non-smooth area into said smooth area.

Further according to the invention there is provided, in an electrical discharge machining apparatus comprising a table means for supporting a workpiece, a rotatable electrode, means for supporting said electrode with one end thereof in close proximity to but spaced from said workpiece, means for rotating said electrode, and means for maintaining a high frequency electric discharge between said electrode and said workpiece, the improvement comprising, means for supporting said electrode with its axis disposed at an acute angle, measured between said axis and said workpiece, within the range of from 85° to 89.4°.

Still further according to the invention there is provided an electrode assembly, comprising, a mounting block, a bore provided in said mounting block and extending at least partially therethrough, a rotatable electrode mounted in said bore with at least one end portion of said electrode extending outside said mounting block, and means connected to said electrode for rotating same.

EDM is well known. For example, see U.S. Pat. No. 3,475,312, issued Oct. 8, 1969, and U.S. Pat. No. 2,778,924, issued Jan. 22, 1957, and the patents referred to therein. A good description of the fundamentals of EDM is given in the publication "Fundamentals of EDM", published by Elox Division of Colt Industries (1964), Griffith Street, Davidson, N.C. 28036.

In the methods of the invention, EDM is employed in a manner which, insofar as I am now aware, has not heretofore been employed in the art, and to obtain results which could formerly be obtained only with greater expenditure of manpower and EDM time.

The steps utilized in the methods of the invention will depend upon the severity of the damage to the spinnerette or other workpiece. In some instances only an EDM treatment is required. In other instances involving more severe damage, it has been found that for best results it is desirable to incorporate one or more other steps prior to, or in preparation for, said EDM treatment. Said other steps are discussed further below.

Figure 1:
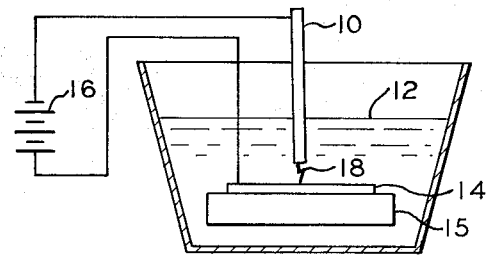
FIG. 1 is a diagrammatic illustration of the basic elements of an EDM machine.

Referring now to the drawings, wherein like numerals are employed to denote like elements, the invention will be more fully explained. EDM comprises a process of metal removal from a workpiece by means of an electrical discharge (spark) between an electrode and said workpiece in the presence of a dielectric liquid (coolant). For example, in accordance with the prior art, in FIG. 1 an electrode 10 having an end area perpendicular to its axis is disposed in a bath of dielectric liquid 12. A spinnerette or other workpiece 14 is disposed on a suitable movable table means 15 with the nonsmooth surface area or damaged area on its face adjacent and essentially perpendicular to, but spaced apart from the end area of said electrode. Said movable table 15 comprises means by which the nonsmooth area or damaged area on the face of the workpiece can be caused to traverse said end area of said electrode. Said electrode and said workpiece are each connected to a suitable power supply 16. During said traversing movement a high frequency discharge (electric spark 18) is maintained between said electrode and said workpiece. Said spark discharge is generated by a suitable capacitive or other discharge device (not shown) which comprises a part of an EDM machine. Said electrode is fed toward the workpiece by means of a servo mechanism (not shown) which is adapted to maintain substantially constant the gap width (discharge gap) between the electrode and the workpiece. A jet of the dielectric liquid flushes particles of the removed metal from the work area. Said liquid also serves as a coolant.

In the repair of spinnerettes, said servo mechanism will permit the electrode to follow the convex surface of the spinnerette face as it is moved in a plane under the electrode. By moving either the spinnerette or the electrode relative to the other, and traversing the other, a distance which is less than the transverse dimension of the end area of the electrode so as to maintain at least a portion of the damaged area of the spinnerette opposite the end area of the electrode while maintaining the high frequency electrical spark discharge, the surface finish in said damaged area can be "feathered" or blended into the original surface of the spinnerette face. This is a preferred procedure for use in the practice of the invention of said U.S. Pat. No. 3,857,012 so as to obtain the best results.

For example, when employing an electrode having a diameter or other transverse dimension of about ⅛ inch on the end area thereof, one would move the spinnerette in a to and fro (back and forth) manner about 1/16 inch in at least two directions about 90° apart in a plane beneath the end area of the electrode. This example is given by way of illustration only and is not intended to be limiting on the invention of said patent U.S. Pat. No. 3,857,012. It is within the scope of the invention of said patent to employ larger or smaller dimensioned electrodes and thus permit the spinnerette to be moved a greater or smaller distance. It is usually preferred that movement of the spinnerette be accomplished manually by an operator. However, it is within the scope of the invention of said patent to automate the movement of the spinnerette. It is also within the scope of the invention of said patent to maintain the spinnerette stationary and move the electrode so as to traverse the damaged area on the spinnerette.

It is one of the advantages of the present invention that the above-described traversing movements are substantially or completely eliminated in most instances when repairing spinnerettes. In the practice of the present invention, it has been found that, in most instances, all that is required is a positioning of the tilted rotating electrode over the damaged area. However, it is within the scope of the present invention to employ said traversing movements when it is advantageous so to do, e.g., when following an elongated scratch or indentation, or repairing a wide damaged area, on a spinnerette or other workpiece.

Figure 1A:
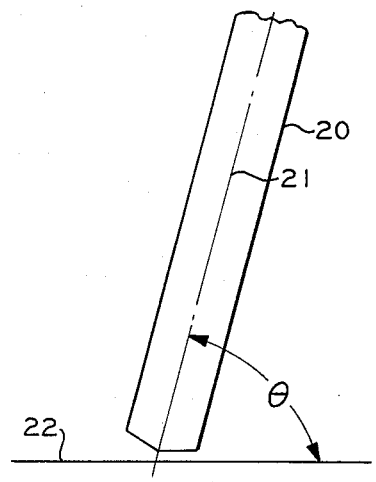
FIG. 1A is a diagrammatic illustration of the inclined or tilted position of the electrode in the practice of the invention.

Referring now to FIG. 1A, there is illustrated diagrammatically the inclined position of the electrode in the practice of the present invention. Said electrode 20 is inclined at an acute angle $\theta$, measured between the axis 21 of the electrode and the surface of the workpiece 22, which is within the range of from 85° to 89.4°, preferably 87° to 89.4°, more preferably 88.5° to 89°. For convenience, it is usually preferred that said acute angle between the axis of the electrode and the surface of the workpiece be established by positioning the workpiece with its surface horizontal, and then mounting the electrode in a tilted or inclined position (from the perpendicular) as illustrated in FIG. 1A. However, it is within the scope of the invention to establish said acute angle by mounting the electrode in vertical position (perpendicular to the horizontal) and then tilting the table on which the workpiece is positioned so as to obtain said acute angle. Any suitable means can be employed for tilting said table, e.g., a shim of suitable predetermined thickness inserted under one side of the table, or a handwheel and screw arrangement.

Figure 2:
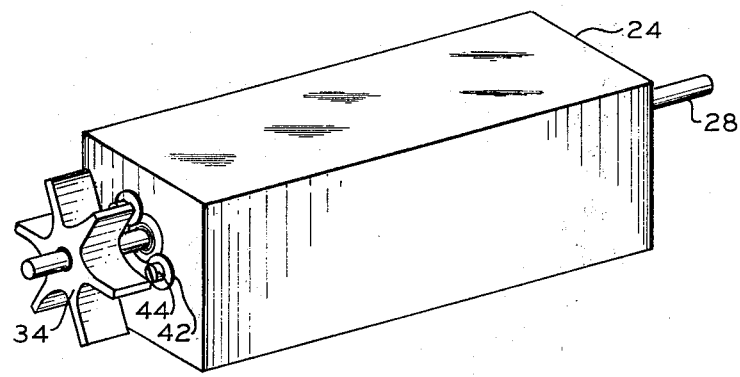
FIG. 2 is a perspective view of an electrode assembly of the invention.
Figure 3:
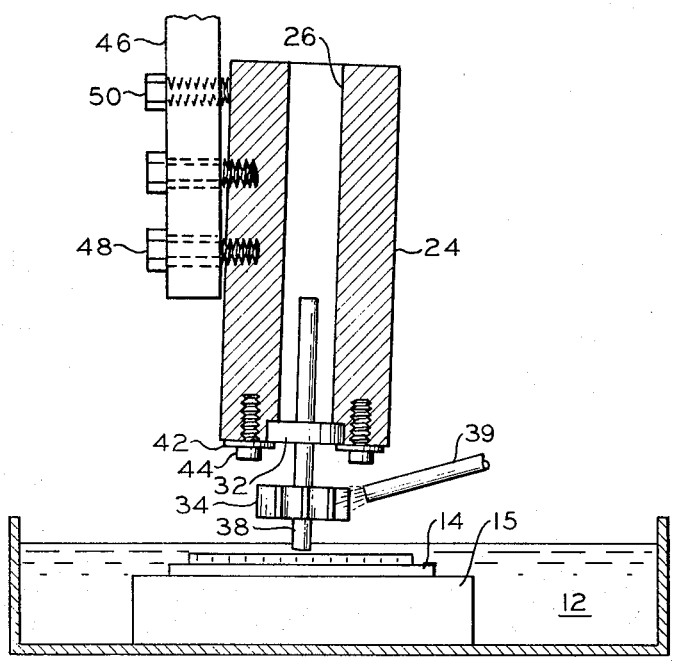
FIGS. 3 and 4 are diagrammatic representations of an EDM machine modified to incorporate therein electrode assemblies of the invention.
Figure 4:
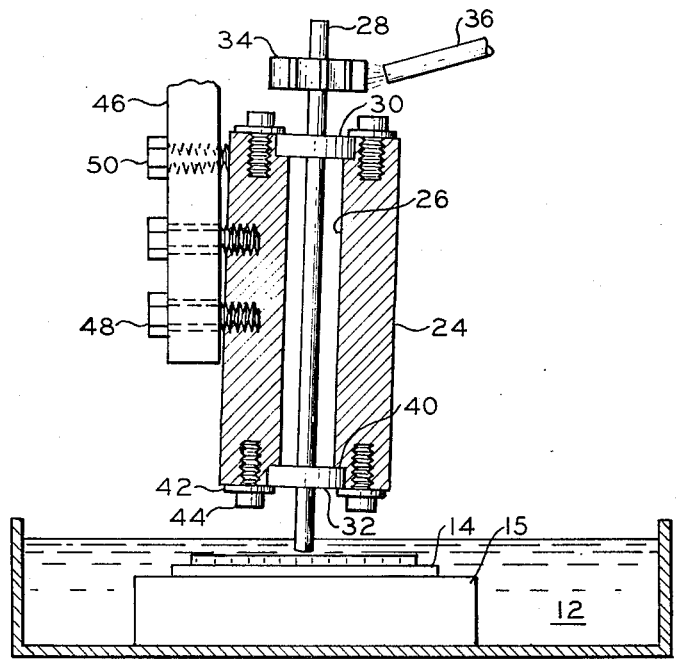

Referring now to FIGS. 2, 3, and 4, there are illustrated presently preferred electrodes and electrode assemblies in accordance with the invention. One electrode assembly in accordance with the invention comprises a mounting block 24 having a bore 26 extending at least partially therethrough. In the embodiment illustrated in FIGS. 2 and 4, an electrode 28 is mounted in said bore by means of bearings 30 and 32. Any suitable type of bearing means can be employed. The tow ends of said electrode 28 preferably extend outside opposite ends of said mounting block 24 as illustrated. An impeller 34 is mounted, by any suitable means, on one extended end of electrode 28. Conduit 36 can be connected to any suitable sources of drive fluid, e.g., air, and positioned similarly as shown, for discharging onto impeller 28 and thus rotate said electrode 28.

In the embodiment illustrated in FIG. 3, the electrode 38 is mounted in bore 26 by means of a single bearing 32. Preferably, only one end of said electrode 38 extends outside mounting block 24, and impeller 34 is mounted on said extended end. Conduit 39 can be connected to a source of drive fluid, e.g., dielectric liquid 12, and discharge onto impeller 34 for rotating electrode 38. In this embodiment, when dielectric liquid 12 is used as said drive fluid, it can also advantageously serve as a flush liquid to flush particles of removed metal from the work area.

In both of said embodiments of FIGS. 3 and 4, said bearings 30 and 32 are positioned in mounting block 24 against a shoulder 40 formed at the end(s) of bore 26. Said bearings can be held in said position by means of washers 42 and set screws 44. Any other suitable means can be employed for mounting and holding said bearings in said mounting block 24. It is not essential that the bore 26 extend completely through mounting block 24 in the embodiment of FIG. 3.

Any suitable means can be employed for installing said electrode assemblies in an EDM machine. As illustrated in FIGS. 3 and 4, one convenient means can comprise securing mounting block 24 onto a suitable mounting bar 46 of an EDM machine by means of screws 48. An adjustable set screw 50 is provided for varying the distance or gap between the upper portion of mounting block 24 and mounting bar 46, and thus determining and setting the angle of inclination or tilt of the electrode. In practice, adjustable set screw 50 can be set at a predetermined position and screws 48 then tightened.

Any suitable means can be employed for rotating the electrode in the electrode assemblies of the invention instead of the impeller means illustrated. For example, an electric motor can be operatively connected to an end of the electrode which extends from the mounting block 24.

Figure 5:
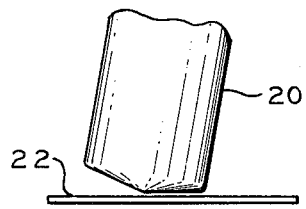
FIG. 5 is a diagrammatic representation of the shape the working end of an EDM electrode attains in the practice of the invention.

FIG. 5 illustrates diagrammatically the approximate shape of the working end of a rotating and inclined solid cylindrical electrode attains in the practice of the present invention. It is believed said shape can best be described as "blunt conical." It will be noted that both the apex and the edge of the cone at the junction with the edge of the electrode are somewhat "rounded off." In the practice of the invention, it is preferred to condition a new electrode by operating same on a sample workpiece for a period of time sufficient for the working end of the electrode to attain the above-described shape before using the electrode on an actual workpiece. Usually, said conditioning time will be in the order of 5 to 30 minutes, depending upon such factors as angle of inclination, the EDM conditions employed (current, etc.), the material the electrode is made of, etc. Usually, other factors being substantially equal, smaller angles of inclination (from the vertical) result in shorter conditioning times.

In EDM the rate of metal removal and the surface finish can be controlled by controlling discharge voltage, current, and frequency of the electrical discharge (spark). The above-discussed servo mechanism senses the discharge voltage and uses this to control the discharge gap, which in turn controls or determines the actual discharge voltage.

The rate of metal removal in EDM is dependent upon the amount of electric current used. As the current is increased for a particular discharge (spark) frequency, the metal removal rate increases because each spark contains more energy. For example, for a given discharge frequency, when the current is doubled the amount of energy in the spark is doubled and rate of metal removal is doubled. In the practice of the invention, when using a supply voltage within the range of from about 30 to about 50 volts, the current can range from about 10 to about 3 milliamps, respectively. At 40 volts the current can be in the range of 6 to 7 milliamps.

The surface finish obtained in the practice of the invention can be controlled by controlling the discharge frequency, i.e., the number of sparks per second between the electrode and the spinnerette. For a given current value, a given amount of energy is available per unit of time. Thus, for a greater number of sparks per second, there will be less energy per spark, and the amount of metal removed per spark will be less. Since each spark in removing metal leaves a cavity, it is desirable for a smooth finish to operate at the higher frequencies so as to produce smaller cavities. In the repair of spinnerettes in accordance with the invention, frequencies in the order of 65,000 to 260,000, or higher, cycles per second, are presently preferred. It is more preferred that the frequency be at least about 200,000 cycles per second. It has been found that frequencies in the order of 260,000 cycles per second give good results.

Voltages in the range of 30 to 60, preferably 40 to 45, volts can be used in the practice of the invention. The voltage, per se, is of less importance that the other operating variables discussed above. Sufficient voltage must be used to cause the discharge (spark) to jump the gap between the electrode and the spinnerette. For any given voltage supply setting, the above-discussed servo mechanism which feeds the electrode toward the spinnerette senses the discharge voltage between the spinnerette and the end area of the electode and moves the electrode toward and away from the spinnerette to control the discharge gap, and thus compensate for unevenness in spinnerette surface, as in a damaged area thereof. The following relationship between voltage and discharge gap has been determined by actual measurement.

| Voltage | Discharge Gap |
|---|---|
| 50 | 0.0014 ± 0.001 inch |
| 40 | 0.0012 ± 0.001 inch |
| 20 | 0.0009 ± 0.0006 inch |
| 10 | 0.0005 ± 0.0005 inch |

It has been found that the rotating electrode can have an operating range up to 47,000 RPM, at least. Preferably, the speed of rotation will usually be in the range of 300 to 9,000 RPM; more preferably in the range of about 500 to about 1,500 RPM.

The ranges given above for the various operating variables are not intended to be unduly limiting on the invention. Said ranges are included here primarily as a guide to those skilled in the art, and the use of current values, discharge frequencies, voltages, and discharge gaps outside said ranges is within the scope of the invention. There can be some variation in said operating variables with variation in electrode material and the material of which the spinnerette or other workpiece is made.

As a further guide to those skilled in the art, but not by way of limitation on the invention, we have found that the average EDM treatment time will be in the order of 1.5 to 6 minutes, per damaged capillary and adjacent damaged area, under the above-described conditions. Similarly, a short or light EDM treatment will usually be less than 1 minute.

Spinnerettes are well known articles in the synthetic fiber industry. Most commonly, spinnerettes are round in shape as illustrated in FIG. 2 of said Patent 3,857,012, but can be made in any suitable shape, e.g., square, rectangular, etc. Commonly, they will have from 26 to 136 capillaries therein, depending upon the process in which they are employed, but can have more or less capillaries, arranged in various patterns. Said capillaries are most commonly round but can have other shapes, square, rectangular, trilobal, etc. Commonly, the capillaries in said spinnerettes will have diameters, or effective outlet cross sections, in the range of 0.005 to 0.030 inch, more commonly, in the range of 0.0009 to 0.015 inch. Said spinnerettes are usually made of metals, such as the various stainless steels, but can be made of other suitable materials. The invention is applicable to, and can be employed in the repair of, spinnerettes or other workpieces made from any electrically conductive material.

Any suitable type of electrode can be employed in the practice of the invention. Solid cylindrical electrodes are presently preferred. However, electrodes of other shapes, e.g., square, triangular, etc., can be employed. It is also within the scope of the invention to employ tubular or hollow electrodes. It is presently preferred that said electrodes have a diameter, or other end area transverse dimension, of about 1/8 inch. However, it is within the scope of the invention to employ electrodes having larger or smaller end area dimensions, e.g., 1/16 to 1/4 inch. Said electrodes can be made of any suitable electrically conductive material. One presently preferred material is a tellurium-copper alloy. However, other materials which can be used include tungsten, tungsten alloys, graphite, copper, brass, and others.

The EDM is carried out in the presence of a dielectric liquid which forms a dielectric barrier between the electrode and the spinnerette at the discharge gap, serves as a coolant, and flushes eroded particles out of the discharge gap. Any suitable dielectric liquid can be used in the practice of the invention. Specially prepared and refined oils having known characteristics are commercially available and are usually used. However, other liquids such as distilled water can be used. A presently preferred dielectric liquid for use in the practice of the invention is Eloxol No. 13, a specially prepared and refined oil sold by the Elox Division of Colt Industries.

The following examples will serve to further illustrate the invention. Said examples include the repair of a spinnerette wherein the damage was severe enough to make it desirable to employ steps or operations in addition to the EDM treatment, e.g., certain pretreatment steps prior to EDM.

EXAMPLE I

Two series of runs were carried out wherein the surface of a stainless steel spinnerette was subjected to electrical discharge machining with an inclined electrode rotating about its axis in accordance with the invention. For convenience, the angle of inclination or tilt of the electrode was measured from the vertical, and will be so referred to in this example. In all of the runs the EDM treatment was carried out at a voltage of 40 volts, and a discharge frequency of 260,000 cycles, which will draw a current of about 5 milliamps, and employing a 1/8 inch cylindrical solid electrode made of a tellurium-copper alloy. Other operating conditions were varied as set forth below in connection with each series of runs. In each run a treated spot was formed on the surface of the spinnerette, which spot varied in size depending upon the particular operating conditions employed. In each run of each series of runs the spots were measured as to width and length in mils (0.001 inch), and were photographed.

In a first series, the runs were carried out employing a conventional EDM machine which had been modified to incorporate the essentials of the apparatus illustrated in FIG. 4. In these runs the electrode was air driven at a speed of 27,000 RPM with a stream of air from a conduit essentially like conduit 36 discharging onto impeller 34. The angles of tilt or inclination investigated were 3°, 2°, 1.5°, 1°, 0.5°, and 0.0°. At each angle of tilt, runs were made at 5, 10, 20, 40, and 80 seconds EDM time.

A second series of runs was carried out wherein said EDM machine had been modified to incorporate the essentials of the apparatus illustrated in FIG. 3. In these runs the electrode was oil driven at a speed of 700 RPM with a stream of oil (dielectric liquid 12) from a conduit essentially like conduit 39 discharging onto impeller 34. The angles of tilt investigated were 2°, 1.5°, and 1°. At each angle of tilt, runs were made at 5, 10, 20, 40, and 80 seconds EDM time.

Data from said first and second series of runs are combined into Table I below.

Table I

EDM Spots Measurement Data (Example II)

| RPM | Drive Fluid | Angle of Tilt Degrees[a] | EDM Time - Seconds | | | | | | | | | |
|---|---|---|---|---|---|---|---|---|---|---|---|---|
| | | | 5 | | 10 | | 20 | | 40 | | 80 | |
| | | | Spot Dimensions - mils | | | | | | | | | |
| | | | W[b] | L[b] | W | L | W | L | W | L | W | L |
| 27,000 | Air | 3.0 | 25 | 50 | 30 | 69 | 33 | 65 | 40 | 68 | 50 | 70 |
| 27,000 | Air | 2.0 | 25 | 50 | 25 | 60 | 30 | 64 | 33 | 65 | 40 | 70 |
| 700 | Oil | 2.0 | 34 | 30 | 35 | 41 | 46 | 44 | 61 | 55 | 73 | 63 |
| 27,000 | Air | 1.5 | 25 | 59 | 41 | 63 | 49 | 64 | 58 | 68 | 67 | 70 |
| 700 | Oil | 1.5 | 32 | 40 | 43 | 43 | 55 | 53 | 70 | 65 | 80 | 70 |
| 27,000 | Air | 1.0 | 45 | 60 | 60 | 70 | 70 | 72 | 81 | 83 | 100 | 82 |
| 700 | Oil | 1.0 | 43 | 48 | 54 | 60 | 65 | 64 | 80 | 85 | 96 | 86 |
| 27,000 | Air | 0.5 | | | | | Not Measured | | | | | |
| 27,000 | Air | 0.0 | | | | | Not Measured | | | | | |

[a]Measured from the vertical.
[b]W = width; L = length.

In general, the spot measurements data in the above Table I show: (1) the spot size increases with increasing EDM time; and (2) for a given EDM time and a given electrode RPM, the spot size increases as the angle of tilt of the electrode decreases. The spinnerette used in the above runs was a used spinnerette and the face thereof was slightly convex due to pressure on the back side during spinning operations. At angles of tilt of 0.5° and less this convex shape introduces an error in the actual angle between the electrode and the face of the spinnerette, depending upon the location of the treated spot on the face of the spinnerette. From visual inspection of the treated spots at 0.5° and 0.0° of tilt it was evident that spot dimension measurements at these angles of electrode tilt were not reliable, and therefore were not made for this reason. Visual inspection was relied on for spot evaluation at 0.5° and 0.0° of tilt.

EXAMPLE II

Two other series of runs were carried out to compare the single-bearing electrode of FIG. 3 and two-bearing electrode of FIG. 4. The single-bearing electrode was operated at 1000 RPM using oil drive. The two-bearing electrode was operated in the reverse position from that shown in FIG. 4 and was driven at 700 RPM using oil drive. The angle of electrode tilt was 1.5°, measured from the vertical, in both series of runs. Other operating conditions were as set forth in Example I above.

In general, the spot measurement data showed that the spots obtained with the single-bearing electrode were more nearly round and covered a larger area than the spots obtained with the two-bearing electrode. From the spot measurement data and visual spot inspection (and spot measurement data and visual spot inspection in other series of runs) it was concluded that the single-bearing electrode gave a more gradual feathering or blending of the treated surface into the original surface than did the two-bearing electrode. Thus, it was concluded that in many instances the single-bearing electrode would be the preferred tool to employ, depending upon the type of damage being repaired.

EXAMPLE III

Another series of runs was carried out to investigate spot size as a function of electrode angle of tilt and electrode RPM, at a constant EDM time of 10 seconds. Spot measurement data from this series of runs are set forth in Table II below. Operating conditions not given in Table II were the same as in Example I. The apparatus employed was a conventional EDM machine which had been modified to incorporate the essentials of the apparatus illustrated in FIG. 4. The two-bearing electrode was air driven similarly as shown in FIG. 4.

Table II

| | EDM Spots Measurement Data (Example III) | | | | | | | | | | | | | |
|---|---|---|---|---|---|---|---|---|---|---|---|---|---|---|
| Angle of Tilt, Degrees[a] | EDM Time Constant at 10 seconds | | | | | | | | | | | | | |
| | RPM | | | | | | | | | | | | | |
| | 47,000 | | 42,000 | | 32,000 | | 22,000 | | 16,000 | | 9,000 | | 5,000 | |
| | *W | *L | W | L | W | L | W | L | W | L | W | L | W | L |
| 3.0 | 22 | 45 | 22 | 50 | 27 | 48 | 25 | 63 | 30 | 63 | 40 | 65 | 37 | 65 |
| 2.0 | 15 | 47 | 18 | 49 | 24 | 60 | 26 | 64 | 33 | 65 | 38 | 65 | 37 | 65 |
| 1.5 | — | — | 26 | 51 | 40 | 62 | 39 | 62 | 36 | 63 | 42 | 64 | 45 | 61 |
| 1.0 | 48 | 62 | 51 | 66 | 55 | 64 | 57 | 65 | 55 | 66 | 53 | 64 | 51 | 65 |
| 0.5 | | | | | | | Not measured | | | | | | | |
| 0.0 | | | | | | | Not measured | | | | | | | |

[a]Measured from the vertical.
*Spot dimensions, W = width; L = length in mils.

In general, the spot measurement data in the above Table II show: (1) for a given RPM, the spot size increases as the angle of tilt of the electrode decreases; (2) for the 3°, 2°, and 1.5° angles of tilt of the electrode, there was a definite maximum in spot size in the 5000 to 9000 RPM range; and (3) for the 1.0° angle of tilt of the electrode, there was a remarkably nearly constant spot size over a broad range of RPM.

EXAMPLE IV

Another series of runs was made to compare the method of the present invention with the method set forth in said U.S. Pat. No. 3,857,012. For this series of runs a used spinnerette made of a stainless steel, having a face diameter of 82 millimeters, and having 68 capillaries of 0.0133 inch diameter was used. The face of the spinnerette had a lapped surface finish of about 5 microinches rms (root mean square) when new. Four capillaries or holes were purposely damaged by placing two scratches across each hole with a razor blade. For each hole, one scratch was placed across the central portion of the hole, and the other scratch was placed adjacent the periphery of the hole. The scratches were severe, being about 0.0005 to 0.001 inch deep and 0.002 to 0.003 inch wide. The scratches were as near to being alike as possible. Each hole was then repaired by the procedure set forth below for each.

Hole number 1 was repaired employing a conventional EDM machine modified to incorporate the two-bearing electrode tool of FIG. 4. Said electrode was mounted in inverted position from that shown in FIG. 4, and was tilted 1°, measured from the vertical. The electrode was driven at 700 RPM with oil (dielectric liquid). The electrode, per se, of the two-bearing electrode tool was a ⅛ inch diameter cylindrical solid electrode made of a tellurium-copper alloy.

The damage by the scratches was severe enough to require a pretreatment to restore metal to the damaged area. This was done by staking the face of the spinnerette adjacent said scratches to move metal into the scratches. Said staking step comprised pressing on the spinnerette face in the area of the damage with a sharp pointed tool of hardened alloy steel. The pressure of said tool adjacent the scratch caused the bottom of the scratching to be raised, and produced a series of small nonconnected indentations having diameters and depths in the order of 0.002 to 0.003 inch in the damaged area. The staked areas were then scratched or abraded lightly with a sharpened flexible tool to reduce raised areas. Any suitable tool or abrasive material can be used for this purpose. These operations required about 2.5 minutes. Because of the small dimension of the capillary and the damaged area, these operations were carried out with 40 to 60 power magnification.

An EDM treatment was then carried out on the thus pretreated spinnerette. The EDM was carried out at a voltage of 40 volts, and a discharge frequency of 260,000 cycles per second, which will draw a current of about 5 milliamps, for about 2 minutes and 15 seconds, employing the above-described modified EDM machine.

The capillary exit was then broached with a round broaching tool to restore the capillary to size and restore the roundness thereof.

Examination of the capillary exit and damaged area, under magnification, after said EDM treatment and said broaching treatment indicated the desirablility of further light EDM treatment. The damaged area was given a further EDM treatment for 30 seconds under the same operating conditions. After a second inspection the capillary exit was given a second light broaching treatment and a further EDM treatment of 5 seconds under said conditions. This completed the repair of Hole No. 1.

Hole number 2 was repaired employing said EDM machine modified to incorporate the two-bearing electrode tool of FIG. 4, mounted in the position there shown, with a tilt of 1.0°, measured from the vertical. The ⅛ inch diameter cylindrical solid electrode made of a tellurium-copper alloy was air driven at 27,000 RPM.

The repair was initiated with about 2.5 minutes of staking and scratching operations as described above for hole number 1. The damaged area was then given an EDM treatment of 2 minutes and 30 seconds under the same EDM conditions as for hole number 1. An additional staking and scratching operation was then applied, followed by an additional 2 minutes and 30 seconds of EDM treatment under the same EDM conditions. The capillary exit was then broached, and an additional EDM treatment of 40 seconds under said EDM conditions was applied. This completed the repair of hole number 2.

Hole number 3 was repaired employing said EDM machine modified to incorporate the single-bearing electrode tool of FIG. 3, mounted essentially as there shown, with a tilt of 1.5°, measured from the vertical. The ⅛ inch diameter cylindrical solid electrode made of a tellurium-copper alloy was oil driven at 1000 RPM. During rotation said electrode deviated from said 1.5° tilt by plus or minus 0.5°.

The repair was initiated with about 2.5 minutes of staking and scratching operations, as for holes 1 and 2, described above. The damaged area was then given an EDM treatment of 1 minute and 30 seconds under the same EDM conditions as for holes 1 and 2. No additional staking and scratching was necessary after said EDM treatment. The capillary exit was then broached with a broaching tool. An additional 30 seconds EDM treatment under the same EDM conditions completed the repair of hole number 3.

Hole number 4 was repaired in accordance with the method of said U.S. Pat. No. 3,857,012, employing a vertically positioned, nonrotating, ⅛ inch diameter cylindrical solid electrode made of a tellurium-copper alloy.

The repair was initiated with about 2.5 minutes of staking and scratching operations as for holes 1, 2, and 3, described above. The damaged area was then given an EDM treatment of 6 minutes under the same EDM conditions as for holes 1, 2, and 3. An additional staking and scratching operation was then applied, followed by an additional 1 minute and 30 seconds of EDM conditions. The capillary exit was then broached with a broaching tool. An additional 2 minute EDM treatment under the same EDM conditions completed the repair of hole number 4. During the EDM treatments carried out in the repair of hole number 4 the spinnerette was moved, relative to the end area of the electrode, in a to and fro (back and forth) manner about 1/16 inch in at least two directions about 90° apart.

Repair depth in the damaged area was measured for all four holes. The following Table III summarizes the above-described repair of holes 1 to 4.

TABLE III

| Hole No. | Angle of Tilt, deg.(a) | Electrode Tool | Drive Fluid | RPM | Repair Depth, in. | Total EDM min:sec |
|---|---|---|---|---|---|---|
| 1 | 1.0 | D.B.(b) | Oil | 700 | 0.0008 | 2:50 |
| 2 | 1.0 | D.B. | Air | 27,000 | 0.0008 | 5:40 |
| 3 | 1.5 | S.B.(c) | Oil | 1,000 | 0.0009 | 2:00 |
| 4 | 0.0 | — | — | 0 | 0.0005 | 9:30 |

(a)measured from the vertical.
(b)double bearing - see FIG. 4.
(c)single bearing - see FIG. 3.

Based on the data set forth in the above Table III it is concluded that the repair methods of the present invention are more efficient than the method of said U.S. Pat. No. 3,857,012, at least insofar as the total EDM time is concerned, when the data for holes 1, 2, and 3 are compared with the data for hole 4. From a comparison of the data for holes 1 and 2 it is concluded that oil-drive at 700 RPM is more efficient than air-drive at 27,000 RPM when employing the two-bearing electrode of the invention. From the data for holes 1, 2 and 3, it is concluded that the methods of the invention comprising the use of the single bearing electrode are the most efficient. The repair depth figures given in the above Table III are an approximate measure of the depth of the original scratches. The scratches for hole 4 were less severe than the scratches for holes 1, 2, and 3. Thus, from these data it is concluded that the methods of the present invention can be employed to repair more severely damaged areas in less time than when employing the methods of said U.S. Pat. No. 3,857,012.

In the above examples the angle of tilt of the electrode was measured from the vertical, for convenience. When so measured, angles of tilt which are useful in the practice of the invention are from 0.6° to 5°, preferably 0.6° to 3°, more preferably 1° to 1.5°. However, as mentioned above, in its broad aspects the invention includes measuring the angle of tilt as the acute angle between the axis of the electrode and the face of the work piece.

As indicated above, the particular steps, and the number thereof, employed in the repair methods of the invention will depend upon the severity of the damage to the spinnerette or other work piece. In some instances where the amount of damage is relatively small, e.g., a minor scratch having a depth in the order of up to 0.0002 to 0.0003 inch, an EDM treatment only can be sufficient. In other instances involving more severe damage, other steps in addition to EDM are desirable, such as one or more of the steps described in the above Example IV.

It is to be definitely understood that said other steps employed in the above Example IV are not always required. For example, there can be instances where the damage is severe enough to make a metal restoration step, e.g., staking, desirable; but where the damage does not affect the capillary exit, the broaching step may not be necessary. In other instances, e.g., where only a light scratch touches or crosses the capillary exit, the broaching step would probably be desirable, but a metal restoration may not be necessary.

The above described staking operation is the presently preferred metal restoration step. However, other metal restoration steps such as metal deposition in deep indentations as by welding or metalizing by flame spraying can be used. In such instances it will be desirable to plug the capillaries with suitable subsequently removable material, e.g., a suitable ceramic material.

The scratching or abrading step subsequent to the metal restoration step may or may not be necessary or desirable, depending upon the nature and extent of said metal restoration step.

It will also be understood that any of the above described steps in the methods of the invention can be repated at any stage of the repair operation. For example, after a staking step and a first EDM step, it may be desirable to repeat a light staking step and a short second EDM treatment. Or, said light staking step could be omitted and a light scratching or abrading step applied before the second EDM treatment.

A number of advantages are realized or obtained in the practice of the invention. One important advantage is that the use of EDM makes it possible to restore the surface of the spinnerette face, and the finish thereof, without rounding the sharp edges of the capillary exit and without producing a significant decrease in the length of the capillaries in the spinnerette. Another important advantage is that the life of the spinnerette is increased. When spinnerettes are repaired according to conventional methods employing lapping machines and surface grinding, about three times is the maximum number of times a spinnerette can be repaired before it must be discarded. It has been found that in using the methods of the invention that spinnerettes can be repaired on an average of about 10 times. Still another important advantage is a marked reduction in the manpower and time required, i.e., about 10 to 20 percent of the time required when using said conventional lapping and grinding methods.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. A method for producing a continuously smooth surface on a metal workpiece having an irregular surface comprising a nonsmooth area bordered by a smooth area, which method comprises:

electrically removing metal from said nonsmooth area and said bordering smooth area by subjecting said areas to electrical discharge machining with one end of an electrode which is rotating about its axis and which is inclined at an acute angle, measured between said electrode axis and said workpiece, within the range of from 85° to 89.4°; and
   thereby blending said nonsmooth area into said smooth area.

2. A method according to claim 1 wherein the working end of said electrode adjacent said workpiece deviates, during said machining, from said measured angle by an amount within the range of plus or minus 0.5°.

3. A method according to claim 1 wherein the speed of rotation of said electrode is within the range of from about 300 to about 9000 RPM.

4. A method according to claim 1 wherein the electrical discharge in said machining is provided by a current within the range of from about 3 to about 10 milliamps, at a voltage within the range of from about 30 to about 60 volts, and at a discharge frequency within the range of from about 65,000 to about 260,000 cycles per second.

5. A method according to claim 4 wherein:
   the working end of said electrode adjacent said workpiece deviates, during said machining, from said measured angle by an amount within the range of plus or minus 0.5°; and
   the speed of rotation of said electrode is within the range of from about 300 to about 9000 RPM.

6. A method according to claim 5 wherein:
   said measured angle is within the range of from 88.5° to 89.0°; and
   the speed of rotation of said electrode is within the range of from about 300 to about 1500 RPM.

7. A method according to claim 1 wherein said nonsmooth area comprises at least one indentation in the face of said workpiece, and said method comprises, in combination, the steps of:
   a. restoring metal into said indentation;
   b. installing said workpiece in an electrical discharge machining apparatus subsequent to said step (a); and
   c. then subjecting said workpiece to said electrical discharge machining.

8. A method according to claim 1 wherein said nonsmooth area comprises at least one indentation in the face of said workpiece, and said method comprises, in combination, the steps of:
   a. restoring metal into said indentation;
   b. reducing or lowering any raised areas produced in said step (a) by scratching or abrading the area comprising said restored metal;
   c. installing said workpiece in an electrical discharge machining apparatus subsequent to said step (b); and
   d. then subjecting said workpiece to said electrical discharge machining.

9. A method for repairing a spinnerette having on its face a damaged area bordered by an undamaged area, which method comprises:
   electrically removing metal from said damaged area and said undamaged area of said face by subjecting said areas to electrical discharge machining with an electrode which is rotating about its axis and which is inclined at an acute angle, measured between said electrode axis and said spinnerette, within the range of from 85° to 89.4°; and
   thereby blending the surface of said damaged area into the surface of said undamaged area.

10. A method according to claim 9 wherein the working end of said electrode adjacent said spinnerette deviates, during said machining, from said measured angle by an amount within the range of plus or minus 0.5°.

11. A method according to claim 9 wherein the speed of rotation of said electrode is within the range of from about 300 to about 9000 RPM.

12. A method according to claim 9 wherein the electrical discharge in said machining is provided by a current within the range of from about 3 to about 10 milliamps, at a voltage within the range of from about 30 to about 60 volts, and at a discharge frequency within the range of from about 65,000 to about 260,000 cycles per second.

13. A method according to claim 12 wherein:
   the working end of said electrode adjacent said spinnerette deviates, during said machining, from said measured angle by an amount within the range of plus or minus 0.5°; and
   the speed of rotation of said electrode is within the range of from about 300 to about 9000 RPM.

14. A method according to claim 13 wherein the damage to said spinnerette includes damage to at least one capillary therein, and said method comprises, in combination, the additional step of reshaping said capillary subsequent to said electrical discharge machining by inserting a broaching tool into said capillary from the face of the spinnerette so as to restore the opening of said capillary to its original size and shape.

15. A method for repairing a spinnerette having on its face a damaged area comprising an indentation bordered by an undamaged area, which method comprises, in combination, the steps of:
 a. restoring metal into said indentation;
 b. installing said spinnerette in an electrical discharge machining apparatus subsequent to said step (a); and
 c. electrically removing metal from said damaged area and said bordering undamaged area of said face by subjecting said areas to electrical discharge machining with an electrode which is rotating about its axis and which is inclined at an acute angle, measured between said electrode axis and said spinnerette, within the range from 85° to 89.4° and thereby blending the surface of said damage area into the surface of said undamaged area.

16. A method according to claim 15 wherein:
 said step (a) comprises moving metal into the bottom of said indentation by a staking operating comprising pressing on the face of the spinnerette in said undamaged area adjacent said indentation;
 the angle of inclination of said electrode is within the range of from 88.5° to 89°; and
 the working end of said electrode deviates from said measured angle by an amount within the range of plus or minus 0.5°.

17. A method for repairing a spinnerette having on its face a damaged area comprising an indentation bordered by an undamaged area, which method comprises, in combination, the steps of:
 a. restoring metal into said indentation;
 b. reducing or lowering any raised areas produced in said step (a) by scratching or abrading the area comprising said restored metal;
 c. installing said spinnerette in an electrical discharge machining apparatus subsequent to said step (b); and
 d. electrically removing metal from said damaged area and said bordering undamaged area of said face by subjecting said areas to electrical discharge machining with an electrode which is rotating about its axis and which is inclined at an acute angle, measured between said electrode axis and said spinnerette, within the range of from 85° to 89.4° and thereby blending the surface of said damaged area into the surface of said undamaged area.

18. A method according to claim 17 wherein said indentation touches the edge of, or crosses, at least one capillary in said spinnerette, and said method comprises, in further combination, the step of:
 e. reshaping said capillary by inserting a broaching tool into said capillary from he face of the spinnerette so as to restore the opening of said capillary to its original size and shape.

19. A method according to claim 18 wherein said method comprises, in further combination, the step of:
 f. after said step (e), electrically removing metal from the area around said capillary opening by said electrical discharge machining so as to remove burrs or other irregularities which may remain after said step (e).

20. A method according to claim 18 wherein:
 the metal restoration of said step (a) comprises a staking operation which comprises moving metal into the bottom of said indentation by pressing on the face of the spinnerette in said undamaged area adjacent said indentation;
 the angle of inclination of said electrode is within the range of from 88.5° to 89°; and
 the working end of said electrode deviates from said measured angle by an amount within the range of plus or minus 0.5°.

21. In an electrical discharge machining apparatus comprising a table means for supporting a workpiece, a rotatable electrode, means for supporting said electrode with one end thereof in close proximity to but spaced from said workpiece, means for rotating said electrode, and means for maintaining a high frequency electric discharge between said electrode and said workpiece, the improvement comprising, in combination;
 means for rotating said electrode about its axis; and
 means for supporting said electrode with said axis disposed at an acute angle, measured between said axis and said workpiece, within the range of from 85° to 89.4°.

22. In an electrical discharge machining apparatus comprising a table means for supporting a workpiece, a rotatable electrode, means for supporting said electrode with one end thereof in close proximity to but spaced from said workpiece, means for rotating said electrode, and means for maintaining a high frequency electric discharge between said electrode and said workpiece, the improvement comprising, in combination with said apparatus, an electrode assembly comprising:
 a mounting block comprising said means for supporting said electrode;
 a bore provided in said mounting block and extending at least partially therethrough;
 said rotatable electrode mounted in said bore with at least one end portion thereof extending outside said mounting block in said close proximity to said workpiece;
 means for supporting said mounting block and said electrode mounted therein with the axis of said electrode disposed at an acute angle, measured between said axis and said electrode, within the range of from 85° to 89.4°;
 an impeller mounted on said end portion of said electrode which extends outside said mounting block and comprising means for rotating said elctrode about its axis; and
 a drive fluid conduit positioned for discharging a drive fluid onto said impeller and rotating said electrode.

23. An electrical discharge machining apparatus in accordance with claim 22 wherein:
 only one end portion of said electrode extends outside said mounting block;
 said electrode is supported in said bore by a single bearing located adjacent said extended end; and
 said impeller is mounted on the end portion of said electrode which extends outside said mounting block.

24. An electrical discharge machining apparatus in accordance with claim 23 wherein:
 said table means is disposed in a container containing a bath of dielectric liquid; and
 said drive fluid conduit is in communication with said bath of dielectric liquid for discharging said dielectric liquid onto said impeller.

* * * * *